(12) United States Patent
Miller-Cushon

(10) Patent No.: US 8,019,888 B2
(45) Date of Patent: Sep. 13, 2011

(54) REQUEST ROUTING SYSTEM FOR AND METHOD OF REQUEST ROUTING

(75) Inventor: Jim Miller-Cushon, Merrickville (CA)

(73) Assignee: International Business Machines Corporation, Armonk, NY (US)

( * ) Notice: Subject to any disclaimer, the term of this patent is extended or adjusted under 35 U.S.C. 154(b) by 1035 days.

(21) Appl. No.: 11/408,912

(22) Filed: Apr. 21, 2006

(65) Prior Publication Data

US 2006/0290977 A1    Dec. 28, 2006

(30) Foreign Application Priority Data

Jun. 23, 2005 (CA) ..................................... 2510626
Sep. 13, 2005 (CA) ..................................... 2518894

(51) Int. Cl.
*G06F 15/173* (2006.01)
(52) U.S. Cl. ..................................... 709/238; 370/395.3
(58) Field of Classification Search ............... 370/395.3; 709/238–243
See application file for complete search history.

(56) References Cited

U.S. PATENT DOCUMENTS

| | | | |
|---|---|---|---|
| 6,484,161 | B1 | 11/2002 | Chipalkatti et al. |
| 7,773,604 | B2 * | 8/2010 | Lin ............... 370/395.3 |
| 7,869,361 | B2 * | 1/2011 | Balay et al. ............ 370/395.3 |
| 2002/0136204 | A1 * | 9/2002 | Chen et al. .................... 370/352 |
| 2002/0152307 | A1 | 10/2002 | Doyle et al. |
| 2003/0033428 | A1 * | 2/2003 | Yadav .......................... 709/238 |
| 2003/0158905 | A1 | 8/2003 | Petry et al. |
| 2003/0191663 | A1 * | 10/2003 | Sameh ............................. 705/2 |
| 2004/0064824 | A1 * | 4/2004 | McNeely et al. ............ 719/316 |
| 2005/0038906 | A1 * | 2/2005 | Banes et al. .................. 709/238 |
| 2005/0053050 | A1 * | 3/2005 | Ballinger et al. ............ 370/351 |

FOREIGN PATENT DOCUMENTS

| | | | |
|---|---|---|---|
| EP | 1 418 716 | | 10/2005 |
| JP | 08288966 | A * | 11/1996 |
| JP | 2001016258 | A * | 1/2001 |
| JP | 2003-186780 | | 7/2003 |
| KR | 420957 | B * | 3/2004 |
| WO | 01/44951 | | 6/2001 |

OTHER PUBLICATIONS

"Quality-of-Search concept for communication-related search operations." IBM Technical Disclosure Bulletin. Jan. 2002. UK. Issue 453, p. 155. Jan. 1, 2002.*

* cited by examiner

*Primary Examiner* — Jeffrey R Swearingen
(74) *Attorney, Agent, or Firm* — Shumaker & Sieffert, P.A.

(57) ABSTRACT

A request router manager receives information of one or more objects associated with the request. Each object belongs to an object class. One or more objects have one or more routing hints assigned to the objects. The request router manager groups the associated objects into one or more object sets based on the object class and the routing hints of the objects, and evaluates predefined routing rules based on the object sets to determine a destination server group name that identifies a destination server group for the request. The request is forwarded to the destination server group based on the destination server group name.

19 Claims, 4 Drawing Sheets

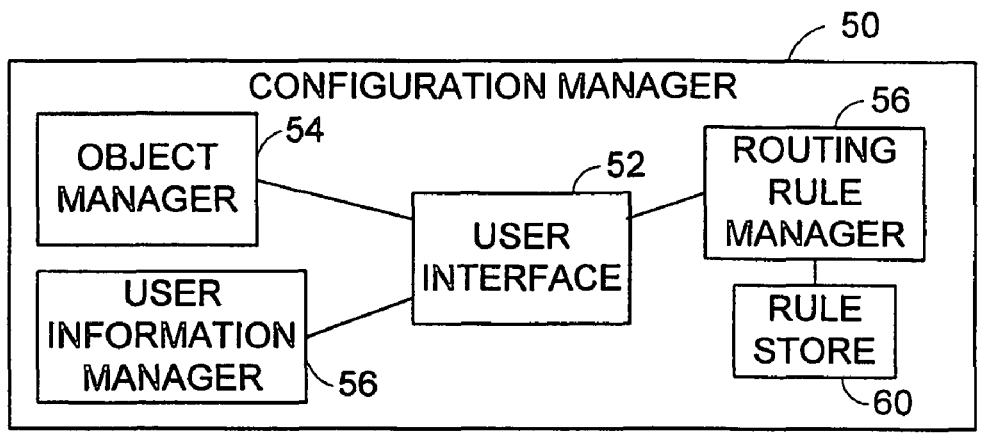
Figure 4
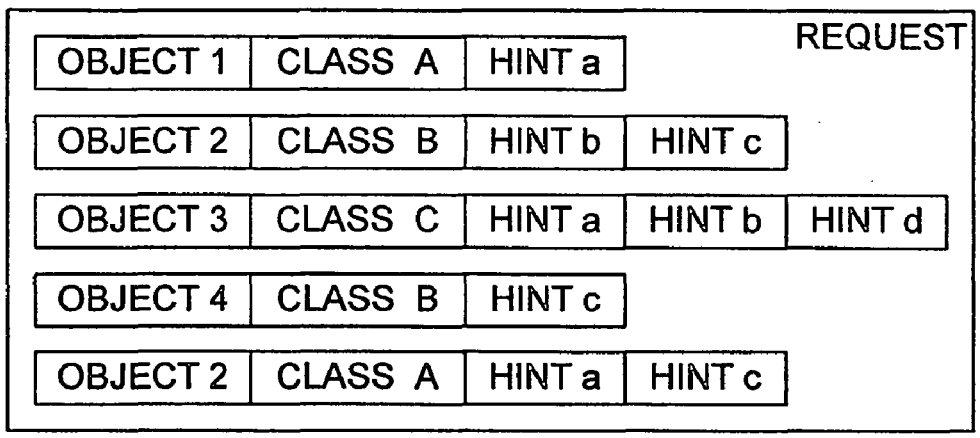
Figure 5
| USER GROUP 1 | HINT s | HINT t | |
|---|---|---|---|
| USER GROUP 2 | HINT u | | |
| USER GROUP 3 | HINT t | HINT v | HINT w |
Figure 6

REQUEST ROUTING SYSTEM FOR AND METHOD OF REQUEST ROUTING

FIELD OF INVENTION

The present invention relates to a request routing system and a method of request routing.

BACKGROUND OF THE INVENTION

Many corporations and other organizations use report generating systems. Large organizations typically use multiple report servers by which reports are generated from various data sources and served to networked clients.

According to a standard concept within the realm of current network management, network traffic is routed based on consideration of user, cost, time of day, and/or performance considerations. Some existing reporting systems route requests among the multiple report servers based on such a standard concept, but they do not allow users to control routing of requests.

Organizations often want to designate certain requests to be served by a particular subset of the report servers. For example, each department within an enterprise is responsible for acquiring, maintaining, and managing its own servers, and the department prefers that these servers are used primarily by members of the department. Also, an organization may have a mixed environment with servers running different operating systems, on different hardware, and servers of a certain type are configured to access and generate reports against specific databases. A server type can connect only to its specific, associated databases, and has no connectivity to the databases used by the other server types. In such a case, reports authored for specific databases need to be routed to the corresponding server type.

It is therefore desirable to provide a mechanism that allows users to control where and how requests are routed.

SUMMARY OF THE INVENTION

It is an object of the invention to provide a system for request routing that obviates or mitigates at least one of the disadvantages of existing systems for request routing.

The invention uses routing hints assigned to objects, each belonging to an object class, to determine to which server group requests are to be routed.

In accordance with an aspect of the present invention, there is provided a request routing system for routing requests issued by clients to servers. The request routing system comprises multiple request dispatchers, a router manager and a request manager. Each request dispatcher is associated with one or more servers. The request dispatchers are grouped into one or more groups such that each group of dispatchers forms a server group. Each server group has a name. Each dispatcher is capable of routing a request to a dispatcher of a server group named in a request. The router manager has a request information handler, an object set handler, and a server group selector. The request information handler is provided for receiving information of one or more objects associated with a request, each object belonging to an object class, one or more objects having one or more routing hints assigned to the objects, and for returning a destination server group name which identifies a destination server group for the request. The object set handler is provided for grouping the associated objects into one or more object sets based on the object class and the routing hints of the objects. The server group selector is provided for evaluating routing rules based on the object sets to determine the destination server group name. The request manager has an object handler and a request modifier. The object handler is provided for sending the information of objects associated with the request to the router manager. The request modifier is provided for receiving the destination server group name, and adding it to the request.

In accordance with another aspect of the invention, there is provided a request router manager for managing routing of requests issued by clients to servers. The request router manager comprises a request information handler, an object set handler and a server group selector. The request information handler is provided for receiving information of one or more objects associated with a request, each object belonging to an object class, one or more objects having one or more routing hints assigned to the objects, and for returning a destination server group name which identifies a destination server group for the request. The object set handler is provided for grouping the associated objects into one or more object sets based on the object class and the routing hints of the objects. The server group selector is provided for evaluating routing rules based on the object sets to determine the destination server group name such that the request is sent to the destination server group.

In accordance with another aspect of the invention, there is provided a method of routing a request from a client to a group of servers. The method comprises steps of receiving information of one or more objects associated with the request, each object belonging to an object class, one or more objects having one or more routing hints assigned to the objects; grouping the associated objects into one or more object sets based on the object class and the routing hints of the objects; evaluating predefined routing rules based on the object sets to determine a destination server group name that identifies a destination server group for the request; and forwarding the request to the destination server group based on the destination server group name.

In accordance with another aspect of the invention, there is provided a computer readable medium storing computer readable code for use in the execution in a computer of the method of routing a request from a client to a group of servers.

In accordance with another aspect of the invention, there is provided a propagated signal carrier containing computer executable instructions and/or statements that can be read and executed by a computer, the computer executable instructions being used to execute the method of routing a request from a client to a group of servers.

This summary of the invention does not necessarily describe ail features of the invention.

BRIEF DESCRIPTION OF THE DRAWINGS

These and other features of the invention will become more apparent from the following description in which reference is made to the appended drawings wherein:

FIG. 4 is a block diagram showing a configuration manager of the request routing system;

FIG. 5 is a diagram showing an example of a request having routing hints assigned to objects;

FIG. 6 is a diagram showing an example of user groups with routing hints assigned;

DETAILED DESCRIPTION

Figure 1:
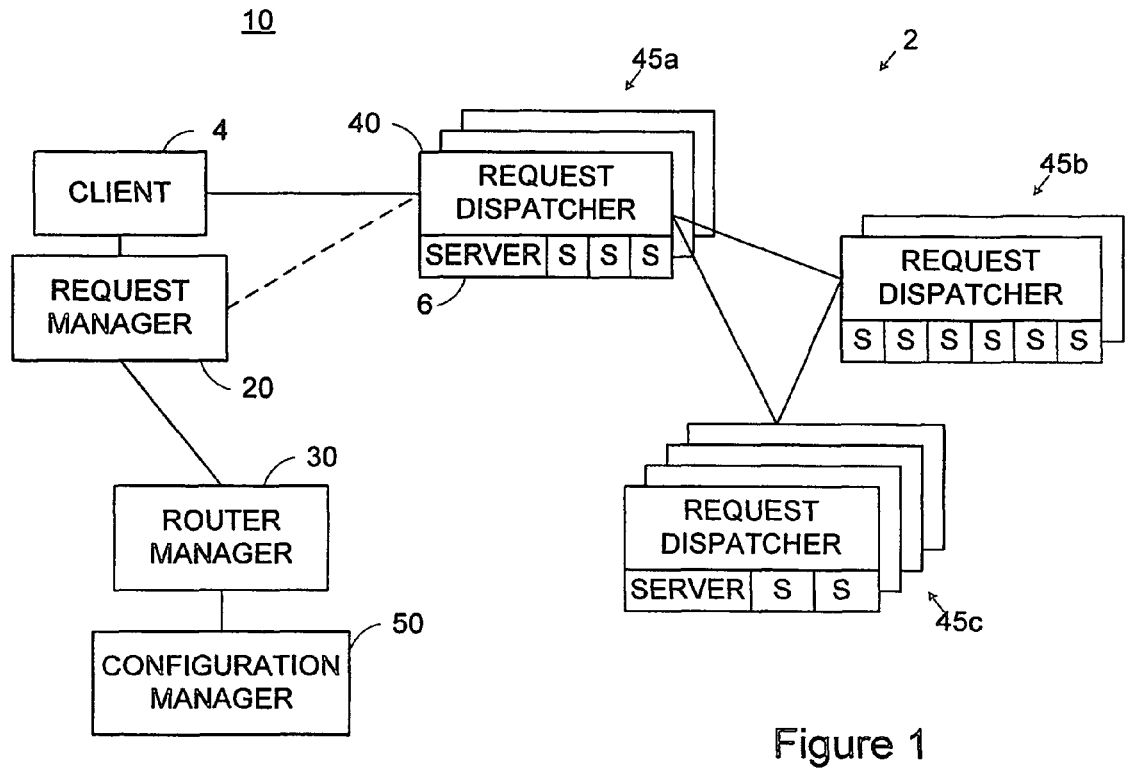
FIG. 1 is a block diagram showing a request routing system in accordance with an embodiment of the present invention.

FIG. 1 shows a request routing system 10 in accordance with an embodiment of the invention. The request routing system 10 is used in a computer network 2 having one or more clients 4 and one or more servers 6. The computer network 2 is typically provided for a single organization having multiple departments using multiple servers 6. A client 4 may be a report viewing tool or a scheduling or monitor service tool that generates requests for services, such as a request to generate a report. A single client 4 is shown in FIG. 1 for simplicity of the drawing. Each server 6 provides a specific service, such as a report generation service.

The request routing system 10 manages routing of requests of clients 4 to specific server groups depending on information in the requests. The request routing system 10 comprises a request manager 20, a router manager 30, multiple request routers or dispatchers 40, and a configuration manager 50. As shown in FIG. 4, the configuration manager 50 has a user interface 52, an object manager 54, a user information manager 56 and a routing rule manager 58.

A request generated by a client 4 has one or more objects associated with the request. For example, a request to generate a report is associated with one or more objects, values of which are to be included in the generated report. Each object belongs to an object class. The administrator may use any object classes that are associated with the request. For example, a specific user wants to generate a report using a specific report specification. The report specification was generated using a package of metadata that is extracted from a database system. These objects: user, report spec, package, are associated with the request. The administrator may use these object classes. Also, the administrator may define any arbitrary object class that can be associated with a request, such as a timeOfDay object. An object class may be a package of objects based on which a report is authored, or a user group to which a user belongs. Other examples of object classes include user account, user role, time of day, and user's current location. A user account refers to a login. It corresponds to the identity of an individual who has been authenticated (e.g. through a login) and is known to the system. A user role class is similar to a user group class, and represents a set of permissions. A user may belong to several groups, but may choose to act in a specific role. For example, a privileged "super user" may choose to act in the role of an unprivileged user to generate a report that is to be sent to a customer, thus avoiding the risk of inadvertently generating a report that contained sensitive information.

The request routing system 10 allows, through the object manager 52, an administrator to assign one or more routing hints to each object. A routing hint is information relevant to routing. It may be a string value that is relevant to routing. An object may have more than one routing hint. Each routing hint value serves to identify a set of objects, i.e., all objects of the same class with the same routing hint value forms a set.

FIG. 5 shows an example of a request, having five associated objects: Object 1 to Object 5. Object 1 belongs to class A. It is assigned with routing hint a. Similarly, object 2 belongs to class B, and is assigned with routing hint b and routing hint c, and so on. Hint value "a" serves to form a set of Object 1 and Object 5, both of which belong to Class A. Similarly, hint value "c" serves to form a set of Object 2 and Object 4, both of which belong to Class B.

An example of a routing hint is a package hint having an identification of a package that is used to author a report requested by the user. A package is a collection of objects that are suitably collected and/or organized for a particular purpose, such as generating a certain report or reports, or responding to a certain type of request. An administrator may assign one or more package hints to a package through the object manager 54.

Another example of a routing hint is a user group hint that relates to a user who issues a request through a client 4. Each user belongs to one or more user groups, e.g., a sales group, a finance group, or a public group. When a user issues a request through client 4, the request includes identification of the user groups to which the user belongs. Thus, this information may be used as a routing hint so that a request is routed depending on a user group to which the user who issued the request belongs, i.e., users membership to a user group. The system 10 may allow an administrator to assign or modify routing hits to the user groups through the user information manger 56. Each user group may have one or more routing hints.

FIG. 6 shows an example of an organization in which there are three user groups. User Group 1 is assigned with routing hint s and hint t. Similarly, user group 2 is assigned with routing hint u, and so on.

Referring back to FIG. 1, request dispatchers 40 are grouped into multiple groups. Each request dispatcher 40 is associated with one or more servers 6. Each group of dispatchers thus forms a group 45a-45c of servers 6. Each server group 45a-45c has a unique group identification or name. A group name of a server group may be a string-valued property of dispatchers 40. All dispatchers 40. that share the same value for this property act as a single "cluster" or group. FIG. 1 shows three server groups 45a-45c, but there may be more or fewer server groups in different embodiments.

Each dispatcher 40 is capable of dispatching requests to its associated. servers 6 or one of other dispatchers 40, based on routing information in the requests. When a request dispatcher 40 receives a request destined for one of its associated servers 6, the dispatcher 40 dispatches the request to the destination server 6. Otherwise, it dispatches the request to one of other dispatchers 40.

The request manager 20 manages requests generated by the client 4. In this embodiment, the request manager 20 is provided at the client 4. When the client 4 generates a request, the request manager 20 takes the request from the client 4 for modification, and returns a modified request to the client 4. The client 4 sends the modified request to one of the request dispatchers 40. In a different embodiment, the request manager 20 may directly send the modified request to one of the request dispatchers 40.

In different embodiments, the request manager 20 may be provided at each request dispatcher 40, or at selected one or more request dispatchers 40. In that case, the client 4 sends a request to a dispatcher 40, and the request manager 20 takes the request from the dispatcher 40 for modification, and returns a modified request to the dispatcher 40 for routing of the request to a destination server 6.

Figure 2:
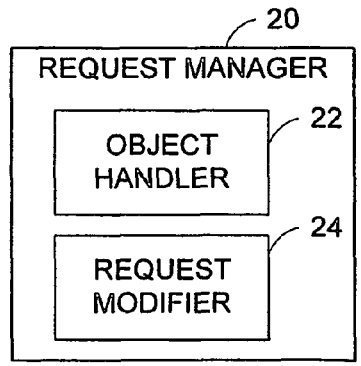
FIG. 2 is a block diagram showing a request manager of the request routing system.

FIG. 2 shows an example of the request manager 20. The request manager 20 has an object handler 22 and a request modifier 24.

The object handler 22 checks a received request, and sends information about objects associated with the request to the router manager 30 to query a destination server group name for the request. The object handler 22 may generate a list of objects associated with the request, and send it to the router manager 30.

The request modifier 24 receives the destination server group name from the router manager 30, and adds it to the request.

Figure 3:
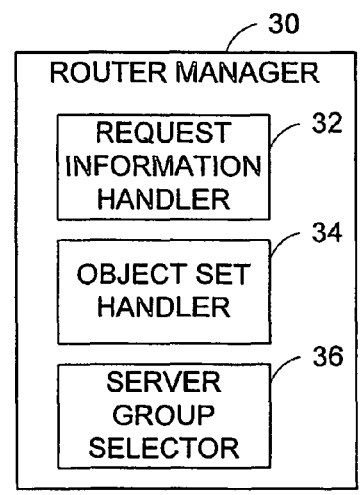
FIG. 3 is a block diagram showing a router manager of the request routing system.

The router manager 30 determines the destination server group name for the request. As shown in FIG. 3, the router manager 30 has a request information handler 32, an object set handler 34, and a server group selector 36.

The request information handler 32 receives from the request manager 20 the list of objects associated with the request. It also returns to the request manager 20 the destination server group name.

The object set handler 34 groups the associated objects into one or more object sets based on the object class and the routing hints assigned to each object.

As shown in FIG. 5, internally in an object, each routing hint value is associated with each object class. The dispatcher selector 36 considers each object as one or more object-class/routing-hint pairs. Different objects can have the same hint value. This allows the administrator to define arbitrary sets of objects: All objects of a specific class that have the same hint value form an object set. An object can belong to more than one object set by having more than one routing hint.

The server group selector 36 determines the destination server group name by evaluating routings rules that were previously defined by the administrator. The routing rules are evaluated based on the object sets. Each routing rule contains a set of one or more predetermined criteria and a server group name. The server group selector 36 checks the value of the routing hints assigned to the objects associated with the request, in view of the criteria of each routing rule. A routing rule is matched when the value of the routing hints satisfies the criteria of the routing rule. When a routing rule is matched, the server group selector 36 determines that the server group name of the routing rule is the destination server group name for the request. The routing rules are evaluated in a predetermined order until a rule is first matched. The server group selector 36 sends the determined destination server group name to the request manager 20.

The criteria of a rule specifies one or more values of a package hint, a user group hint, user account hint, user role hint, time of day hint, location hint, or other hint corresponding to other object class defined in the system 10. For example, a rule may be expressed logically as follows:

```
If ( packageHint=="somehint" &&
userIsMemberOfGroupWithThisHint("finance") )
{
    serverGroup = "financeServers";
}
```

This example rule is matched if the package associated with this request has a package hint with value "somehint", and the user making the request is a member of a user group that has a group hint with value "finance". If the rule is matched, the destination server group name is "financeServers".

An administrator may define and modify routing rules through the routing rule manager 58. The routing rule manager 58 stores defined ordered lists of routing rules in a routing rule store or table 60.

Figure 7:
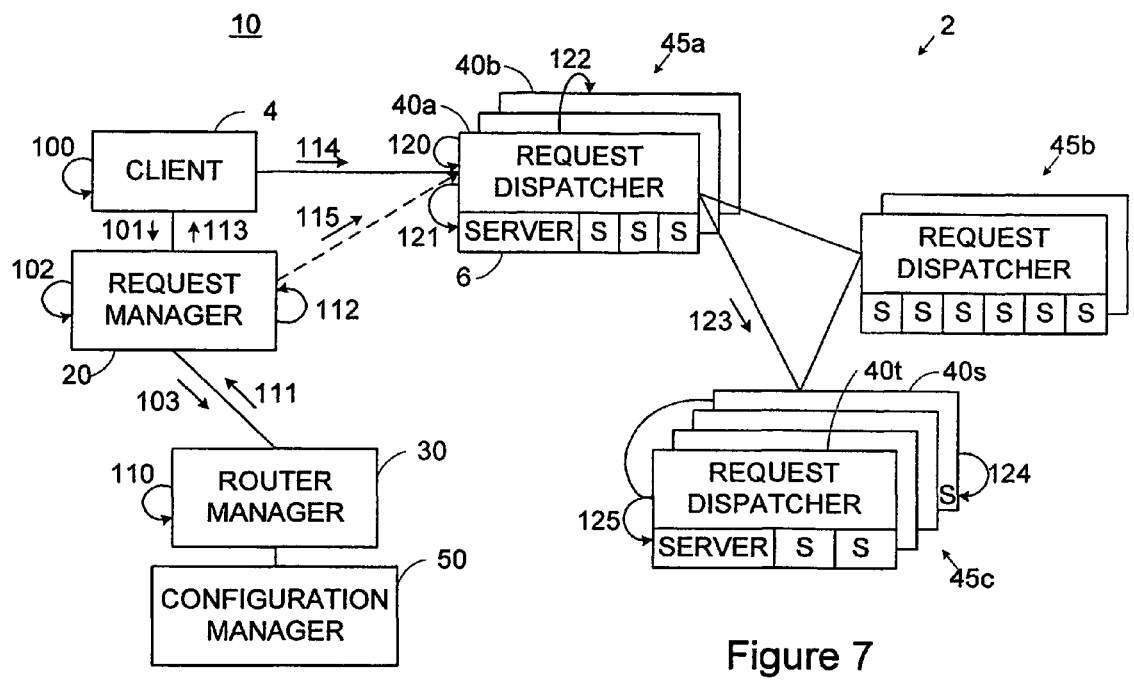
FIG. 7 is a diagram showing the operation of the request routing system.

The operation of the request routing system 10 shown in FIG. 1 is now described referring to FIG. 7.

A user generates a request through client 4 (100). The request manager 20 receives the request from the client 4 (101), and generates a list of objects associated with the request (102). The request manager 20 sends the list of the associated objects to the router manager 30 to query a name or value of a destination routing server group for the request (103).

The router manager 30 receives the list of objects associated with the request, and determines a destination server group name for the request (110), as further described below. The router manager 30 sends the destination server group name to the request manager 20 (111).

The request manager 20 receives the destination server group name, and adds it to the request (112). The request manager 20 returns the modified request to the client 4 (113). The client 4 sends the modified request to one 40a of the request dispatchers 40 (114). Alternatively, the request manager 20 may send the modified request to one 40a of the request dispatchers 40 (115).

The request dispatcher 40a receives the modified request, and checks the destination server group name in the request (120). If the destination server group name is the name of the server group 45a to which the dispatcher 40a belongs, the dispatcher 40a either forwards the request to a destination server 6 directly or forwards it to another dispatcher in the same server group 45a. It chooses request dispatcher in server group 45a by round robin, so as to spread requests reasonably evenly across all the servers. If the destination server group name is different from the name of the server group 45a to which the dispatcher 40a belongs, the dispatcher 40a forwards the request to a dispatcher 40s that belongs to the named destination server group 45c (123). The dispatcher 40s forwards it to a destination server 6 directly or chooses another dispatcher in the server group 45c by round robin.

Figure 8:
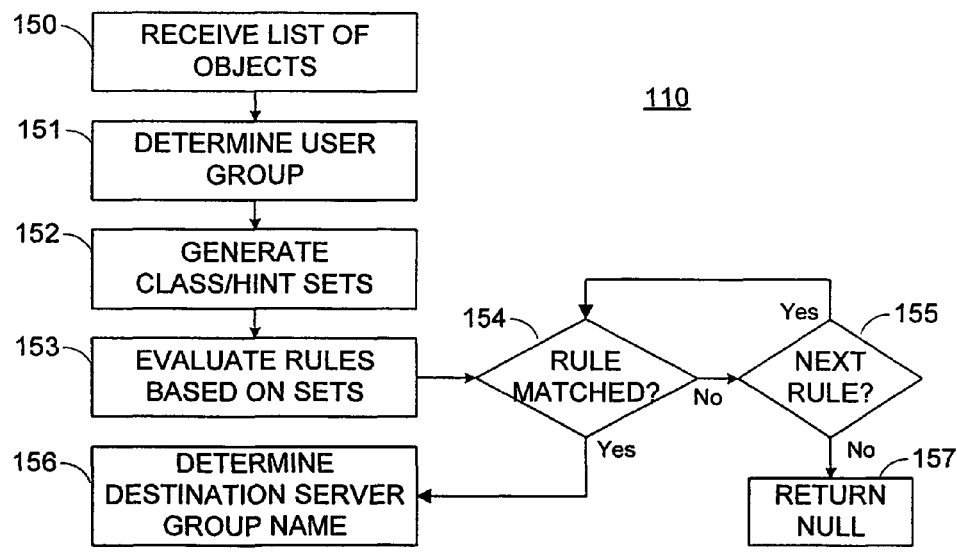
FIG. 8 is a flowchart showing determination of a destination server group name.

The determination of the destination server group name at step 110 is shown in FIG. 8. The router manager 30 receives the list of objects associated with the request (150). If a user group hint is used in routing rules, the router manager 30 also determines to which group the user who issued the request belongs (151). The user group is determined using information of the request or information of logging-in by the user. Similarly, the user account, user role, time of day, or user's current location may be determined from the log-in information as necessary. The login information is usually maintained as session information, and is automatically sent along with each request from the user. The router manager 30 then compares each object-class/routing-hint pair of the objects, and generates one or more object sets, each set containing objects that have the same object-class/routing hint pair (152).

The router manager 30 then evaluates predetermined ordered routing rules based on the object sets (153). The evaluation is carried out to see if a routing rule is matched with the routing hints of the object sets (154). If the rule is not matched, the router manager 30 evaluates the next rule (155). When the router manager 30 encounters a first rule that is matched, it determines a server group name in the matched rule as the destination server group for the request (156). The router manager 30 evaluates the routing rules in a predetermined order. If there is no routing rule matched, it returns a test result null (157) for regular dispatch handling.

The modification of the request by the request manager 20 at step 112 in FIG. 7 may be performed by adding the received name of the destination server group to the request. The destination server group may be represented in the request message as a separate header or as additional information added to another header. The new header element, or additional information, identifies which server group should process the request.

For example, a header may have a routing element as follows:

```
<MessageHeader>
    <routing>
        <routingServerGroup>honkingBigCluster</routingServerGroup>
    </routing>
</MessageHeader>
```

Based on this routing element, a dispatcher 40 routes the request to the named server group "honkingBigCluster" in this example. This example shows headers represented as XML, but other formats are possible.

The configuration of the router manager system 10 is further described.

The object manager 54, through the user interface 52, allows an administrator to provide a routing hint property to various object classes, and specify values for the routing hint property on the objects that will be referred to by routing rules. A routing hint property may be an array of string. For example, if the administrator wants to route requests for package GOSales, the administrator assigns a routing hint with a name, e.g., "GOSales", to the package. It is preferable to use a meaningful name for later references. Hints may be thought of as name/value pairs, where the name is the object class of the object that contains the routing hint.

Because the property is an array it is possible to assign multiple hints to each object. In effect, a hint value serves to identify a set of objects that belong to the same class with the same hint value. For example, a package may have hints "GOSales" and "PublicPackage". This package is thus a member of two sets: packages with hint equal to "GOSales", and packages with hint equal to "PublicPackage". An administrator may provide several packages with hint "PublicPackage". In this case, the administrator can define one routing rule to do specific routing for GOSales requests for a specific user group, and another more general rule to route requests for all packages with hint "publicPackage".

The routing rule manager 58, through the user interface 52, allows an administrator to define or modify routing rules during the configuration, and store it as a routing table configuration property in the routing rule store or table 60. This property represents an ordered list of routing rules that map requests to server group name. For example, the routing table property may be structured as follows:

```
struct routingTableEntry {
    routingRule         rule;
    string              serverGroupName;
}
```

A routing rule may be considered as an interface or abstract base class. Subclasses of the routing rule may be defined. An example of a routing rule table containing an array of object hints is:

```
class objectReferenceRoutingRule extends routingRule {
    ObjectHint [ ] objectHints;
}
``` where ObjectHint is a classEnum/hintValue pair:

```
class ObjectHint {
    classEnum           type;
    string              value;
}
``` objectReferenceRoutingRule contains an array of object class and string hint value pairs. Each pair identifies a class, and a hint value, e.g.: package="GOSales" or group="inventoryUsers". This rule is matched by a request that is associated with objects of the specified classes that have matching hint values.

An example is shown below in the syntax of a fictitious programming language:

```
routingTableEntry rte = {
    objectReferenceRoutingRule rule = {
        ObjectHint [ ] hints = {
            {classEnum.package,"GOSales"}
            {classEnum.group,"inventoryUsers"}
        }
    },
    "honkingBigCluster"
}
```

This rule specifies that a request associated with an object of class "package" that has routing hint "GOSales", and is issued by a user who is a member of object class "group" that has routing hint "inventoryUsers" will be routed to a server group named "honkingBigCluster"

The order of the rules is significant and is specified by the administrator when the rules are created. The router manager 30 evaluates the rules in array order and answers with the first match. The administrator orders more specific rules first and more general rules last. More specific rules specify routing for requests that match specific tests, and more general rules specify routing for requests that do not match the more specific tests. For example, the rules may be ordered such that the router manager 30 first checks for rules specific to the user account, then checks rules specific to the role under which the user is acting, then checks rules specific to the user group to which the user belongs, and finally checks rules that apply to all users. A more specific example is a rule that applies to requests from members of a specific group for reports against a specific package that is ordered before a rule that applies to any user against the same package.

The determination of a destination server group name shown in FIG. 8 may be performed by invoking a routing determination method that is implemented by the router manager. The router manager 30 is provided with a routing determination method to expose a routing calculation engine, e.g.,:

String determineRouting(objectIdentifier [ ] routeBy-Objects)

wherein routeByObjects is an array of objectIdentifier. It contains search paths for objects that are to be used to determine routing.

If a routing rule is matched the routing determination method, determineRouting, returns the value of server group name of the matched rule. It returns nil or null if no rule was matched.

The request manager 20 may select requests that contain routing hints for further processing by the request routing system 10, and ignore requests that do not contain any routing hints. The requests with no routing hints will be processed by dispatchers 40 in a normal manner.

Dispatchers 40 may operate in two load balancing modes, "weighted round robin", and "cluster compatible".

Cluster compatible mode is intended for use when the request has already been routed (sprayed) by some other load balancing infrastructure. In cluster compatible mode, a dispatcher 40a attempts to process the request on the local server 6. If the requested service is not available on the local server 6, the dispatcher 40a forwards the request to another dispatcher 40b where the service is available. Defining routing rules by the request routing system 10 in a clustered environment allows the administrator to define special routing for some requests, while still letting most requests be processed by the dispatcher that receives them.

If no rules are matched, or none are defined, the value of a server group is nil. In this case, the dispatcher 40a processes the request in the usual way: it assumes the request is intended for the server group 45a of which the dispatcher 40a is a member, and either sprays the request to another dispatcher 40b in the group 45a, or processes locally, according to the load balancing mode.

If routing rules are defined and one is matched, and the request manager 20 sets the name of a server group in the header of the request, dispatcher 40a that received the request needs to ensure that the request is processed by a dispatcher in the named server group. If the dispatcher that received the request is in the named server group, it handles the request as usual. If the dispatcher 40a is not in the named server group, the dispatcher 40a forwards he request to a dispatcher 40s that is in the named server group 45c and let the recipient 40s round-robin within the named server group 45c. That results in an extra network transaction compared to an alternative where the dispatcher 40a chooses a dispatcher 40t within the named server group by round robin and sends the request directly to the dispatcher that will process the request.

Figure 9:
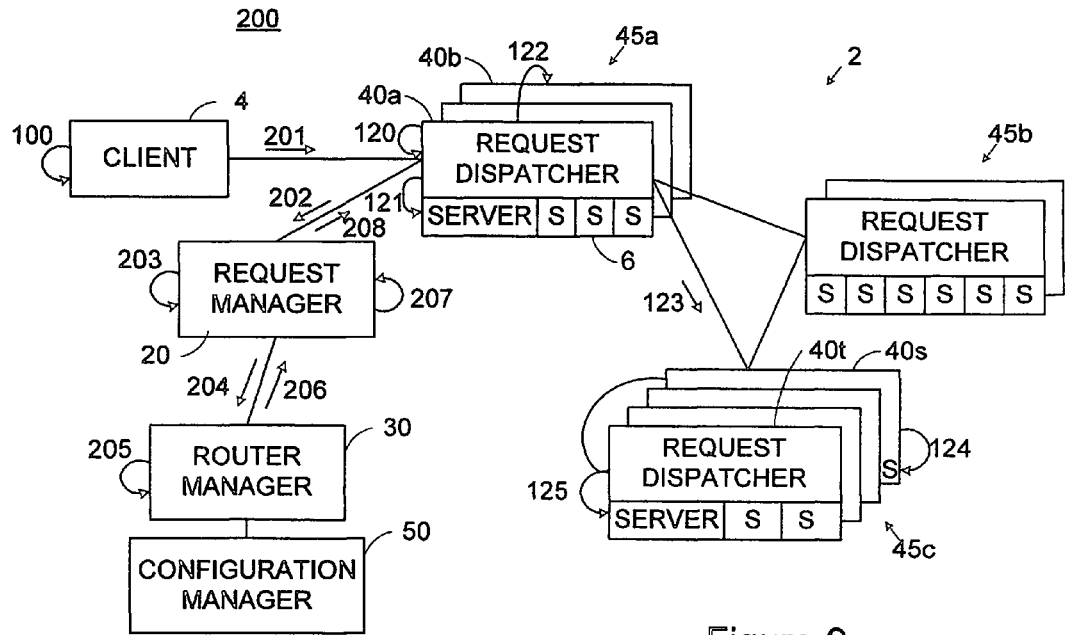
FIG. 9 is a block diagram showing a request routing system in accordance with another embodiment of the present invention.

FIG. 9 shows another embodiment of a request routing system 200. In the request routing system 200, the request manager 20 is provided at a request dispatcher 40. Similar members to those shown in FIG. 1 are shown using the same reference numbers.

In this embodiment, client 4 sends a request to a request dispatcher 40a (201). The request manager 20 receives the request from the dispatcher 40a (202), and generates a list of objects associated with the request (203). The request manager 20 sends the list of the associated objects to the router manager 30 to query a name or value of a destination routing server group for the request (204).

The router manager 30 receives the list of objects associated with the request, and determines a destination server group name for the request (205). The router manager 30 sends the destination server group name to the request manager 20 (206).

The request manager 20 receives the destination server group name, and adds it to the request (207). The request manager 20 returns the modified request to the dispatcher 40a (208). The dispatcher 40a forwards the request to a destination server based on the destination server group name as described above as steps 120-125.

Figure 10:
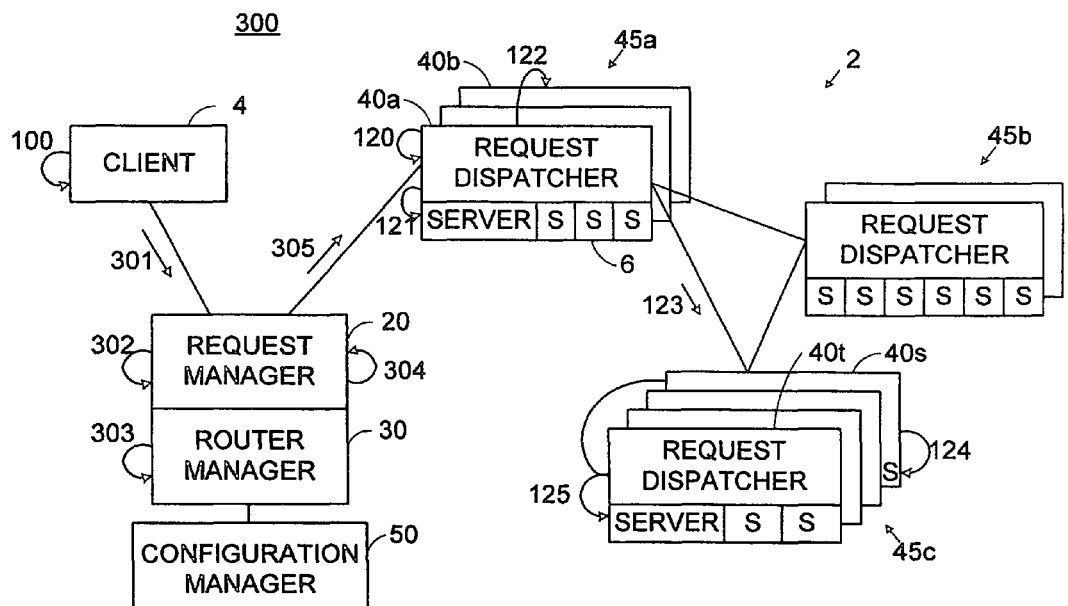
FIG. 10 is a block diagram showing a request routing system in accordance with another embodiment of the present invention.

FIG. 10 shows another embodiment of a request routing system 300. In the request routing system 300, the router manager 30 has the request manager 20. Similar members to those shown in FIG. 1 are shown using the same reference numbers.

In this embodiment, client 4 sends a request to the request manger 20, or the request manager 20 intercepts the request sent to a dispatcher by the client 4 (201). The request manager 20 generates a list of objects associated with the request (302). The router manager 30, using the list of objects associated with the request, determines a destination server group name for the request (303). The request manager 20 adds the destination server group name to the request (304). The request manager 20 sends the modified request to a dispatcher 40a (305). The dispatcher 40a forwards the request to a destination server based on the destination server group name as described above as steps 120-125.

EXAMPLE 1

An example is described using a user organization that has a complex installation with groups of dispatchers, many packages of objects for reports, and user communities or groups. The user administrator wants to set things up so that reports from different packages are executed by users from different groups and run on different groups of dispatchers. This example uses the request routing system 10 shown in FIGS. 1 and 7.

In this example, the user organization has three user groups: FinanceGods, FinanceUsers, and PublicUsers. There are two packages: PromoPackage, and FinancePackage. PromoPackage is a package of flattering promotional reports that is open for public consumption. FinancePackage is a package of financial stuff that is not for public consumption.

The administrator configures the settings of the request routing system 10 by assigning routing hints to user groups and packages, organizes dispatchers into folders, assigns server group names to the folders, and defines the routing rules as follows.

Through a configuration user interface 52, the administrator navigates to a page for setting configuration of the user group FinanceGods. The administrator edits properties of FinanceGods and assigns a routingHint. The administrator may provide a hint using the name "FinanceGods". In this example, however, in view that the hint values may be arbitrary and that the administrator wants to avoid exposing real group names, she assigns a hint value "gFG" to represent "group FinanceGods". The administrator assigns additional hints to the other user groups: hint "gFU" to group FinanceUsers; and hint "gP" to group PublicUsers.

Similarly, the administrator navigates to settings pages for packages, and assigns routing hints to the packages: hint "pFinance" to FinancePackage; and hint "pPromo" to PromoPackage.

Now, the administrator navigates to a server administration page to organize dispatchers into three groups or folders named FastMachines, FinanceMachines, and PublicMachines. FastMachines is a group of a few fast servers dedicated to providing fast response times to a few important users. FinanceMachines are a group of servers intended to be used by users who work in the finance department. PublicMachines is a group of servers that serve public requests, e.g., within an extranet of the organization.

The administrator opens the settings page for folder FastMachines, and sets the name or value of the server group to "sgFastMachines". Similarly, the administrator sets the value of server group for the other folders: server group "sgFinanceMachines" for folder FinanceMachines, and server group "sgPublicMachines" for folder PublicMachines.

The administrator now defines three routing rules: (1) requests from members of user group FinanceGods are routed to server group FastGroup; (2) requests for FinancePackage from members of user group FinanceUsers are routed to server group FinanceMachines; and (3) all other requests are routed to server group PublicMachines.

These rules are expressed as (1) UserGroup: gFG, Package: don't care→sgFastMachines; (2) UserGroup: gFU, Package: pFinance→sgFinanceMachines; and (3) UserGroup: don't care, Package: don't care→sgPublicMachines.

Thus, configuration of the system for request routing is complete.

An example of request routing in this configuration is demonstrated where a finance user who is a member of user group financeUsers runs a report. Referring to FIG. 7, the finance user is logged in through a client 4, i.e., a browser of the finance department. The user navigates to a page that contains a listing of available reports authored with FinancePackage. This causes the browser 4 to send a request to the request manager 20 and hence via to a request dispatcher to a user interface page generation server. Assume that requests for the user interface page generation server are not subject to the routing method, but are simply sprayed round robin fashion to the server instance. The user interface page generation server (UIPGS for brevity) will generate the page that contains the list of reports (101). The UIPGS requests the router manager 30 to get information about the reports to be listed on the page (103). In particular, it asks for a value of the server group to which a request to generate the report should be routed. The router manager 30 evaluates the routing rules to determine the value of server group (110).

Referring to FIG. 8, the determination of the value of server group at step 110 is carried out as follows. The router manager 30 fetches the routing hints from the package referenced by the report (150) and generates a class/hint set: package/pFinance (152). The router manager 30 also determines which user groups the requesting user is a member (151), and fetches the hints from those groups to generate class/hint set: user group/gFU (152). The router manager 30 evaluates the routing rules in first to last order (152-154). The first rule is not matched since the user is not a member of a group with hint gFG (153). The second rule is matched (153), and the router manager 30 determines that the value of routingServerGroup as sgFinanceMachines (155).

Referring back to FIG. 7, the router manager 30 returns the value sgFinanceMachines to the request manager 20 (111). The UIPGS finishes generating the page and replies to the browser 4. The user sees the new page and clicks a control on the page to run the report. This causes the page to submit a request for the request manager 20 to invoke a report viewing server. This request contains all necessary information to tell the report viewing server which report to run, including routing server group. The report viewing server prepares a request for a report generating service from the information it received, by adding the value of routing server group, i.e., sgFinanceMachines, to the header of the request (112). The request manager 20 sends the request to a local dispatcher 40*a* (115).

The local dispatcher 40*a* receives the request for ReportService, and fetches the value of routing server group from the header of the request (120). The dispatcher 40*a* checks the value, and if the value of routing server group from the request matches the name of the server group 45*a* to which the dispatcher 40*a* belongs, it sends the request to one of its associated servers 6 that provides report generating services (121).

If the value of routing server group does not match the name of the server group 45*a*, the dispatcher 40*a* figures out which dispatchers are in the named group 45*c* and forwards the request to one 40*s* of those dispatchers (123).

Alternative: if no rule was matched, the value of routing server group is null. In this case dispatcher 40*a* reverts to its standard routing mechanism, e.g., the request is processed by the dispatcher that receives the request within the server group 45*a* to which the dispatcher 40*a* belongs, or processes the request locally if it is configured to clusterCompatible load balancing mode.

The dispatcher 40*s* in the named group 45*c* receives the request, determines that the value of routing server group matches the group 45*c* to which it belongs, and processes the request by handing it off to a report generating server (125). The report generating server executes the report, generates the output report, and sends it back to the browser 4, where the user sees the requested report.

EXAMPLE 2

In this example, a user organization uses various types of databases against which users report, as follows:

humanResources on DB2, accessed only from Linux servers;

finance on SQL Server, accessed from Win32 servers; and sample database, used to generate reports for promotional/demo purposes.

The following five packages are predefined, and an administrator assigns routing hints as follows:

pkFinance—finance reports for internal consumption by finance users, routing hints: finance;

pkHumanRes—HR reports for internal consumption by HR users, routing hints: hr;

pkHRJobListings—HR reports open to all internal users, routing hints: public_hr, hr;

pkFinanceGeneral—finance reports suitable for general consumption by internal users, routing hints: public_finance, finance; and pkExtranetReports—reports generated against the sample database, routing hints: web.

The following three user groups are predefined, and the administrator assigns routing hints as follows:

ugrpAllUsers—all internal users (employees), routing hints: all;

ugrpFinanceUsers—members of the finance department, routing hints: finance, all; and ugrpHRUsers—members of the human resources department, routing hints: hr, all.

The administrator defines the following five server groups:

sgPublicWin32—Win32 servers to generate reports against the SQL server database for any employee;

sgPublicLinux—Linux servers to generate reports against the DB2 database for any employee;

sgInternalWin32—Win32 servers to generate reports against the SQL server database for members of the finance department;

sgInternalLinux—Linux servers to generate reports against the DB2 HR database for members of the HR department; and sgExtranet—servers to generate reports against the sample database for anonymouns web users.

The administrator defines five routing rules as shown in Table 1.

TABLE 1

| Rule # | Package | Group | serverGroup |
|---|---|---|---|
| (1) | finance | finance | sgInternalWin32 |
| (1) | hr | hr | sgInternalLinux |
| (1) | public_finance | all | sgPublicWin32 |
| (1) | public_hr | all | sgPublicLinux |
| (1) | web | | sgExtranet |

Routing rule (1) allows members of finance to run finance reports on their own internal servers. Routing rule (2) allows members of hr to run hr reports on their own internal servers. Routing rule (3) allows any employee to run public finance reports on the public win32 server group. Routing rule (4) allows any employee to run public hr reports on the public linux server group. Routing rule (5) allows reports against web packages to run on the server group dedicated to extranet requests.

Thus, administrators can specify which group of servers can process requests by setting routing hints and routing rules adequately.

The request routing system 10, 200, 300 allows users to specify a set of servers that can process content on the basis of requests, depending on, e.g., the departmental ownership of physical servers, traffic shaping within the site, or the availability of a data source only on certain platforms.

The request routing system 10, 200, 300 may be used to track the usage of computing resources by each department, so they can effectively determine how much computing power each department needs. This makes it possible to bill each department separately, or to adjust distribution of resources on a department by department basis. Also, the request routing system 10, 200, 300 allow segregation, of requests to ensure quality of service. For example, the request routing system 10, 200, 300 can be used to route requests from users with important work to do to different servers than requests from extranet users. This way heavy load from extranet users does not affect users working on high priority activities.

The request routing system of the present invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements, which may be embedded in a carrier wave may be transmitted via a communication network. Such a computer readable memory and a computer data signal and/or its carrier are also within the scope of the present invention, as well as the hardware, software and the combination thereof.

While particular embodiments of the present invention have been shown and described, changes and modifications may be made to such embodiments without departing from the scope of the invention. For example, the elements of the request routing system are described separately, however, two or more elements may be provided as a single element, or one or more elements may be shared with other component in computer systems.

What is claimed is:

1. A request routing system for routing requests issued by clients to servers, the request routing system comprising:

multiple request dispatchers, each request dispatcher being associated with one or more servers, the request dispatchers being grouped into one or more groups such that each group of dispatchers forms a server group, each server group having a name, each dispatcher being capable of routing a request to a dispatcher of a server group named in the request;

a computer;

a router manager executable by the computer, the router manager having:

a request information handler executable by the computer to receive information of one or more objects associated with the request, each object belonging to an object class, one or more objects having one or more routing hints assigned to the objects, and to return a destination server group name which identifies a destination server group for the request, wherein at least one of the one or more objects is a package that includes values that are to be included in a generated report, wherein the one or more routing hints include one or more package hints that identify the package, and wherein the request comprises a request for the values within the package that are to be included in the generated report;

an object set handler executable by the computer to group the associated objects into one or more object sets based on the object class, the one or more package hints, and the routing hints of the objects; and a server group selector executable by the computer to evaluate routing rules based on the object sets to determine the destination server group name; and a request manager having:

an object handler to send the information of objects associated with the request to the router manager; and a request modifier to receive the destination server group name, and add it to the request.

2. The request routing system as claimed in claim 1, wherein the request manager is provided at a client, and the request manager receives the request from the client.

3. The request routing system as claimed in claim 1, wherein the request manager is provided at one of the request dispatchers, and the request manager receives the request from the request dispatcher.

4. The request routing system as claimed in claim 1, wherein the request manager is provided at the router manager, and the request manager intercepts the request generated by the client.

5. A request router manager for managing routing of requests issued by clients to servers, the request router manager comprising:

a computer;

a request information handler executable by the computer to receive information of one or more objects associated with a request, each object belonging to an object class, one or more objects having one or more routing hints assigned to the objects, and to return a destination server group name which identifies a destination server group for the request, wherein at least one of the one or more objects is a package that includes values that are to be included in a generated report, wherein the one or more routing hints include one or more package hints that identify the package, wherein the request comprises a request for values within the package that are to be included in the generated report;

an object set handler executable by the computer to group the associated objects into one or more object sets based on the object class, the one or more package hints, and the routing hints of the objects; and a server group selector executable by the computer to evaluate routing rules based on the object sets to determine the destination server group name such that the request is sent to the destination server group.

6. The request router manager as claimed in claim 5, wherein the request information handler determines a user group to which a user who issued the request belongs, and one or more user group hints associated with the user group.

7. The request router manager as claimed in claim 5, wherein the server group selector determines a server group name included in a routing rule as the destination server group name when the routing rule matches one of the object sets.

8. The request router manager as claimed in claim 5, further comprising:
   a request manager to add the destination server group name to the request to generate a modified request.

9. The request router manager as claimed in claim 8, wherein the request manager sends the modified request to a dispatcher so that the modified request is forwarded to a dispatcher that belongs to the destination server group.

10. The request router manager as claimed in claim 5, further comprising:
    a configuration manager to allow users to assign routing hints to objects and define routing rules.

11. A method of routing a request from a client to a group of servers, the method comprising:
    receiving information of one or more objects associated with the request, each object belonging to an object class, one or more objects having one or more routing hints assigned to the objects, wherein at least one of the one or more objects is a package that includes values that are to be included in a generated report, wherein the one or more routing hints include one or more package hints that identify the package, and wherein the request comprises a request for the values within the package that are to be included in the generated report;
    grouping, by at least one computer, the associated objects into one or more object sets based on the object class, the one or more package hints, and the routing hints of the objects;
    evaluating, by the at least one computer, predefined routing rules based on the object sets to determine a destination server group name that identifies a destination server group for the request; and
    forwarding the request to the destination server group based on the destination server group name.

12. The method as claimed in claim 11 further comprising:
    determining a user group to which a user who issued the request belongs; and
    determining one or more user group hints associated with the user group.

13. The method as claimed in claim 11, wherein evaluating predefined routing rules comprises determining a server group name included in a routing rule as the destination server group name when the routing rule matches one of the object sets.

14. The method as claimed in claim 11, wherein forwarding the request to the destination server group comprises:
    adding the destination server group name to the request.

15. The method as claimed in claim 14, wherein forwarding the request to the destination server group comprises:
    sending the request with the destination server group name to a request dispatcher for forwarding the request to the destination server group.

16. The method as claimed in claim 11, further comprising:
    allowing a user to assign and/or modify routing hints to objects.

17. The method as claimed in claim 11, further comprising:
    allowing a user to define and/or modify routing rules.

18. The method as recited in claim 11, further comprising:
    grouping multiple request dispatchers to form one or more server groups, each request dispatcher being associated with one or more servers; and
    providing a name to each server group.

19. A computer readable memory device storing computer readable code for execution by a computer to:
    receive, with a request information handler, information of one or more objects associated with a request, each object belonging to an object class, one or more objects having one or more routing hints assigned to the objects, wherein at least one of the one or more objects is a package that includes values which are to be included in a generated report, wherein the one or more routing hints include one or more package hints that identify the package, and wherein the request comprises a request for the values within the package that are to be included in the generated report;
    group, with an object set handler, the associated objects into one or more object sets based on the object class, the one or more package hints, and the routing hints of the objects;
    evaluate, with a server group selector, predefined routing rules based on the object sets to determine a destination server group name that identifies a destination server group for the request; and
    forward, with a request manager the request to the destination server group based on the destination server group name.

* * * * *